United States Patent [19]
Davis

[11] Patent Number: 5,705,918
[45] Date of Patent: Jan. 6, 1998

[54] SWITCHED RELUCTANCE GENERATORS

[75] Inventor: Rex M. Davis, Loughborough, England

[73] Assignee: Switched Reluctance Drives, Ltd., Harrogate, United Kingdom

[21] Appl. No.: 511,352

[22] Filed: Aug. 4, 1995

[30] Foreign Application Priority Data

Aug. 31, 1994 [GB] United Kingdom .................. 9417523

[51] Int. Cl.$^6$ ........................................................ H02P 9/00
[52] U.S. Cl. ............................. 322/94; 322/95; 318/701; 363/20
[58] Field of Search ............................. 318/701; 322/3, 322/94; 310/168

[56] References Cited

U.S. PATENT DOCUMENTS

| | | | |
|---|---|---|---|
| 4,682,093 | 7/1987 | Murphy et al. | 318/701 |
| 5,327,069 | 7/1994 | Radun et al. | 322/10 |
| 5,548,196 | 8/1996 | Lim | 318/701 |
| 5,548,964 | 8/1996 | Stephenson et al. | 318/701 |

OTHER PUBLICATIONS

V. R. Stefanovic etal., *SRM Inverter Topologies: A Comparative Evaluation*, paragraph 3.3; FIG. 1C, Oct. 1990, vol. 2, No. Meeting 25, Oct. 7–12, 1990, Conference Record of the Industry Applications Society Annual Meeting, Seattle.

Bimal K. Bose, *Control System for Switched Reluctance Motor*, U.S. Pat. No. 4,707,650, Nov. 17, 1987.

*Primary Examiner*—Steven L. Stephan
*Assistant Examiner*—Nicholas Ponomarenko
*Attorney, Agent, or Firm*—Arnold, White & Durkee

[57] ABSTRACT

A switched reluctance generator is controlled such that flux growth in a phase winding occurs at a faster rate during the initial part of the phase inductance cycle and at a second, slower rate during the subsequent part of the phase inductance cycle. The difference between flux growth and decay may be achieved either by applying different voltages during the two parts of the phase inductance cycle or by applying the same voltage over only part of the phase winding during the initial part of the phase inductance cycle and then applying that voltage across the phase winding thereafter. It is advantageous to make the increase in flux more rapid than its decay because minimizing the length of time that the flux is present while the phase inductance is rising will minimize the production of unwanted (motoring) torque.

24 Claims, 11 Drawing Sheets

SWITCHED RELUCTANCE GENERATORS

FIELD OF THE INVENTION

This invention relates to switched reluctance generator systems and methods of operating switched reluctance generators.

BACKGROUND OF THE INVENTION

Switched reluctance (SR) generators, like SR motors, use electronic switching circuits. These circuits inject energy from a voltage source into one or more phase windings over a prescribed range of rotor angle and receive back from the phase winding(s) over a later range of rotor angle a larger quantity of energy than previously injected. This additional energy is mechanical energy, imparted to the generator rotor by applying a torque in the direction of rotation.

The inductance of a phase winding varies according to the degree of overlap between the stator poles of that phase winding and the rotor poles as they rotate. If winding current is predominantly occurring while the winding inductance is increasing (i.e. the overlap is increasing), the magnetic force on the rotor pole tends to increase overlap. This is the basis of motoring.

If the winding current is predominantly occurring while the winding inductance is decreasing (i.e. overlap decreasing), the magnetic force is opposing the separation of the rotor and stator poles. This separation against the magnetic force demands an input of mechanical energy to the rotor which is converted in the machine into electrical energy in the form of an increasing winding current. To achieve generation, current must be established in the winding while the inductance is high so that the opposing magnetic force is large during pole separation.

The same configuration of known electronic switching circuit can be used for both motoring and generating operation by adjustment of the range of rotor angle over which energy is injected into the windings and over which energy is received from the windings. Examples of prior art electronic switching circuits are shown in FIGS. 1 and 2. FIG. 1 shows a machine with N phase windings in which each phase winding comprises two separate sections wound together in a way which reduces, as far as possible, the leakage inductance between them. One of these sections is used to inject energy into the machine and the other to receive energy returned from the machine.

FIG. 2, although showing two parallel winding sections to clarify the comparison of $I^2R$ winding losses between FIGS. 1 and 2, can equally well utilise the single section for each winding. In FIG. 2 both switches within each of the two switching circuits must be closed to inject energy from the supply into the winding and both switches must be open for the supply to receive energy from the windings. A beneficial third switching configuration exists when one switch only is closed. In this configuration winding current is free to circulate through one switch and one diode. This is known as 'freewheeling'. In this mode energy may be transferred between the mechanical parts, including the rotor and the electrical circuit, but not to or from the electrical supply.

It will be appreciated that the use of the term 'electrical supply' indicates an electrical storage device which is able both to inject energy into the generator and absorb and store energy generated thereby. Of course, the actual means for injecting energy to the generator and the means for absorbing the energy, whether for storage or direct use, may be separate and distinct entities. For the sake of convenience, the term "load" will be used hereafter to refer both to the electrical supply and associated storage devices and other separate or combined means by which energy passes both to and from the generator.

Because, in the circuit of FIG. 1, current flows in one winding section only, except during a brief period while the current transfers from one section to the other, the sum of the root mean squared [RMS] currents for the two sections taken separately exceeds the RMS value of the sum of the currents taken together. This means that the $I^2R$ winding losses for FIG. 1 are greater than those for the arrangement shown in FIG. 2 in which the two sections have been connected permanently in parallel and additional electronic switching circuitry has been added to provide for the injection and reception of winding energy.

Other switching circuit configurations have been proposed. These generally have the aim of reducing the total number of electronic switches from two per phase (as shown in FIG. 2) to a smaller number in total, but always more than one per phase (as shown in FIG. 1) while still trying to avoid two winding sections for each phase, as shown in FIG. 1. For generation purposes, the angle range over which energy injection occurs coincides with the phase winding having a relatively high inductance (resulting from substantial angular overlap between the stator poles of that phase and the nearest rotor poles in a phase inductance cycle). This is in contrast to motoring purposes in which the phase winding receiving energy from the electrical supply generally has relatively low inductance (resulting from little or no angular overlap between the stator poles of that phase and the nearest rotor poles in a phase inductance cycle).

It is an object of the invention to provide a switched reluctance generator in which the proportion of the phase inductance cycle in which unwanted torque is produced is reduced, thereby making the machine more efficient in a generating mode.

SUMMARY OF THE INVENTION

According to the present invention there is provided a switched reluctance generator system comprising a rotor, a stator having at least one phase winding, switch means, means for supplying energy to the phase winding according to actuation of the switch means, means for rotating the rotor relative to the stator and control means operable to control the switch means, the control means being arranged to actuate the switch means to switch a first voltage from the means for supplying energy across at least part of the phase winding to cause flux growth at a first rate during a first part of a phase inductance cycle, and being arranged to actuate the switch means to switch a second voltage across the phase winding to cause flux decay at a second rate, which second rate of decay is slower than the first rate of flux growth, rotation of the rotor causing energy to be generated at the second voltage from the phase winding during the second part of the phase inductance cycle.

In one form of the invention the first voltage is larger than the second voltage. The means for supplying energy may also be means for absorbing the generated energy and may be constituted by an electrical energy storage device. In this case, the system may also include voltage boosting means to boost the voltage received at the second voltage and delivered at the first voltage, said boosting means including additional switch means.

In an alternative form of the invention the first and second voltages may be substantially the same. The rate of flux growth is determined by applying the voltage to one of two parts of the phase winding and the rate of flux decay is determined by subsequently applying one or other of the said voltages across the greater inductance of the two parts of the phase winding to cause flux decay at the slower rate.

Preferably, the two parts of the phase winding are closely magnetically coupled. They may be connected in series. Conveniently, the two parts of the phase winding are bifilar wound.

Also according to the present invention there is provided a method of operating a switched reluctance generator comprising a rotor and a stator having at least one stator winding, the method comprising:

rotating the rotor;

switching a first voltage across at least part of the phase winding during a first part of a phase inductance cycle to cause flux growth at a first rate during the first part of the phase inductance cycle;

switching a second voltage across the phase winding during a second part of the phase inductance cycle to cause flux decay at a second rate, which second rate of decay is slower than the first rate of flux growth, during the second part of the phase inductance cycle.

In one form of the method the first voltage is larger than the second voltage.

Alternatively, the first and second voltages may be substantially one and the same voltage. This aspect of the method may include applying the one voltage to one of two parts of the phase winding during the first part of the phase inductance cycle; and applying the said voltage to both parts of the phase winding during the second part of the phase inductance cycle.

The invention also extends to a generator comprising: a rotor, a stator having at least one phase winding, the rotor being rotatable relative to a stator; switch means; and control means operable to control the switch means, the control means being arranged to actuate the switch means to switch a first voltage across at least pan of the phase winding to cause flux growth at a first rate during a first part of a phase inductance cycle of the rotor, and being arranged to actuate the switch means to switch a second voltage across the phase winding to cause flux decay at a second rate, which second rate of decay is slower than the first rate of flux growth, rotation of the rotor causing energy to be generated at the second voltage from the phase winding during the second part of the phase inductance cycle.

Typically, the switch means comprise an active switch, such as a semiconductor device, and a diode which are arranged so that energy injection to cause flux growth occurs when the active switch is conducting, energy return (i.e. regeneration) occurs when the active switch is non-conducting and winding current is constrained to flow through the diode.

The period of energy injection into the generator from the electrical supply is associated with the build up of magnetic flux linkage with a phase winding by the connection of the supply voltage across the whole or part of that phase winding. The recovery of energy by the supply is associated with the decay of magnetic flux linkage and the conduction of only the diodes connected with that winding. It is advantageous to make the increase in flux more rapid than its decay because minimising the length of time that the flux is present while the phase inductance is rising will minimise the production of unwanted (motoring) torque.

BRIEF DESCRIPTION OF THE DRAWINGS

The present invention can be put into practice in various ways some of which will now be described by way of example with reference to the accompanying drawings in which.

DETAILED DESCRIPTION OF THE INVENTION

Referring generally to FIGS. 3 to 8, in a first particular form of the invention a configuration of electronic switching circuit for a switched reluctance generator provides a higher voltage source for the purpose of energy injection into the generator windings than the voltage of the load providing the electrical storage capability into which the windings return energy, the returned energy exceeding the injected energy. A feature of this form of the invention is the provision, as part of the electronic switching circuit, of a circuit which takes energy from the load at a lower voltage and converts this to a higher voltage for injection into the generator windings for flux growth at a greater rate because of the higher voltage. The lower voltage is applied across the winding during flux decay so that the decay is more gradual. This circuit conveniently takes the form of the well-known boost converter using high frequency switching and energy storage technology.

Figure 1:
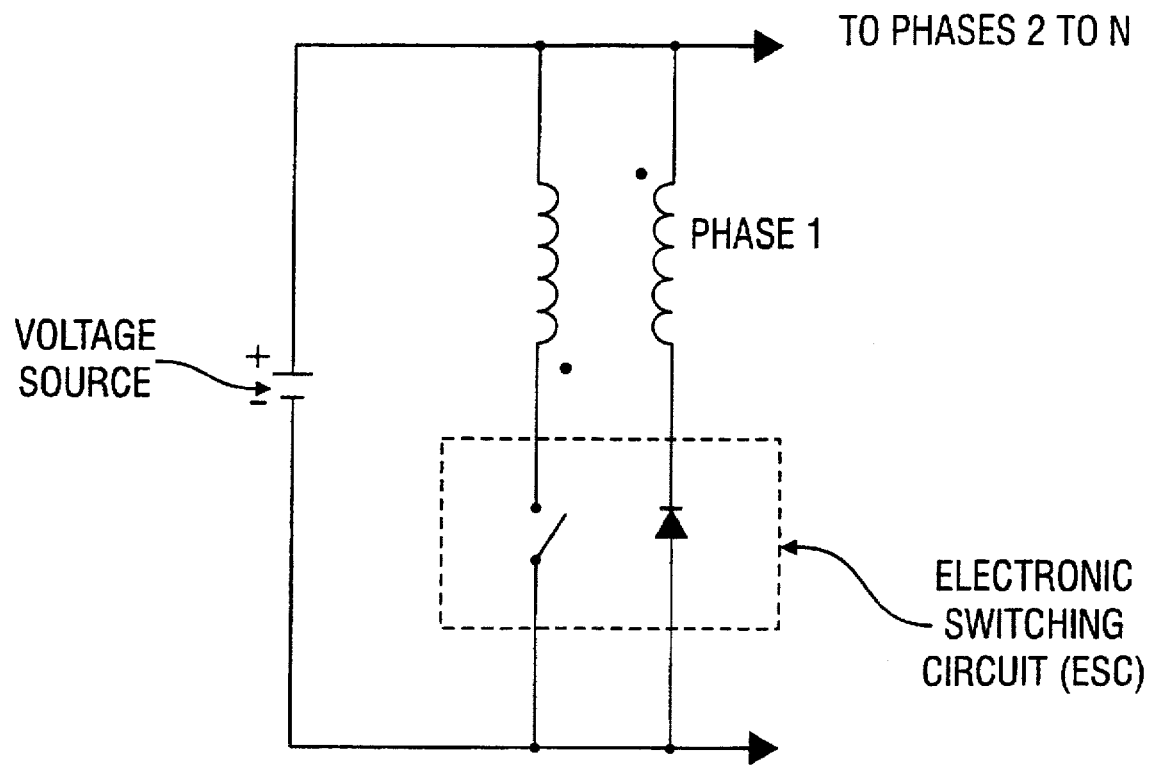
FIGS. 1 and 2 are circuit diagrams of known switched reluctance generator switching circuits.
Figure 2:
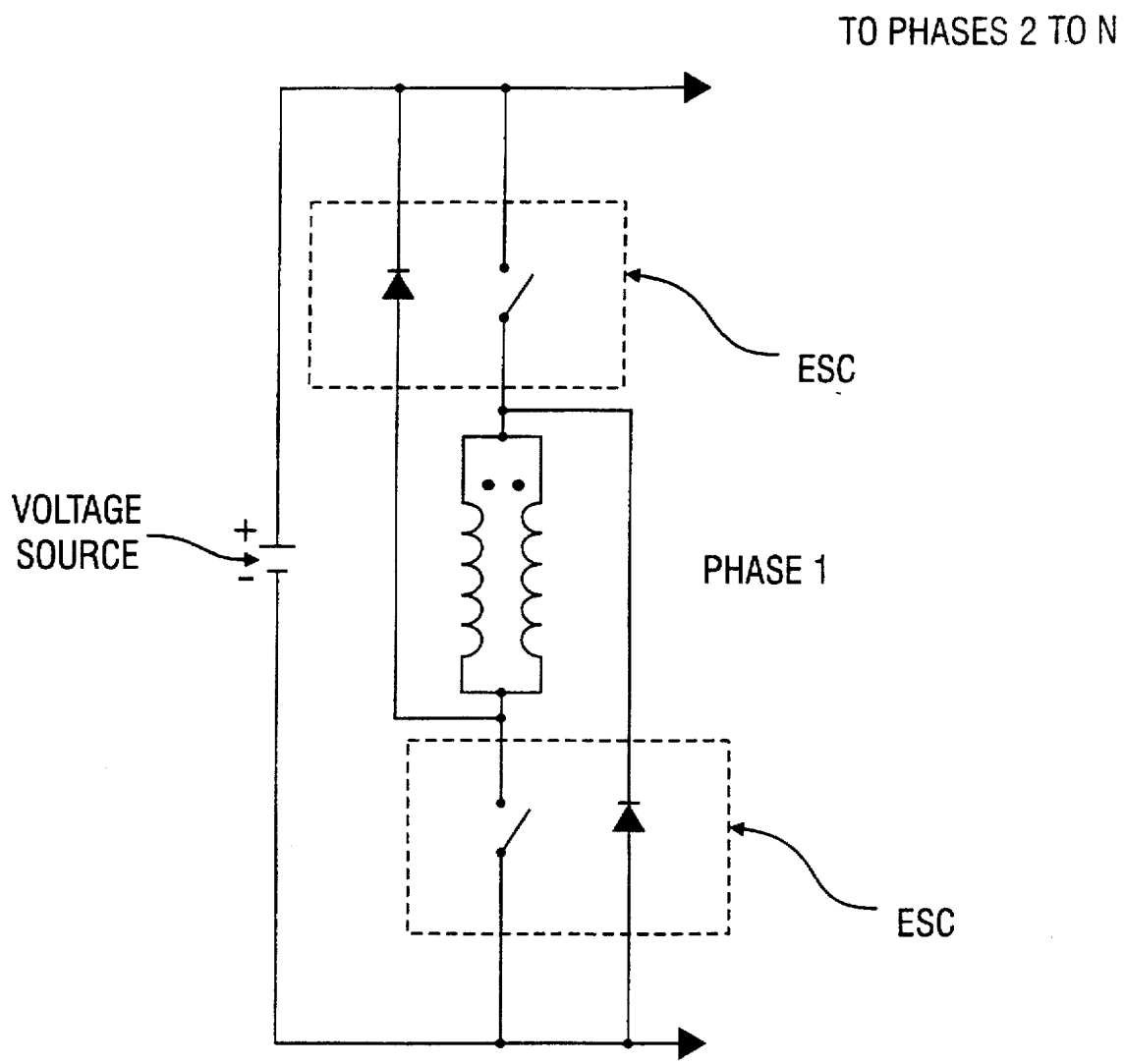
Figure 3:
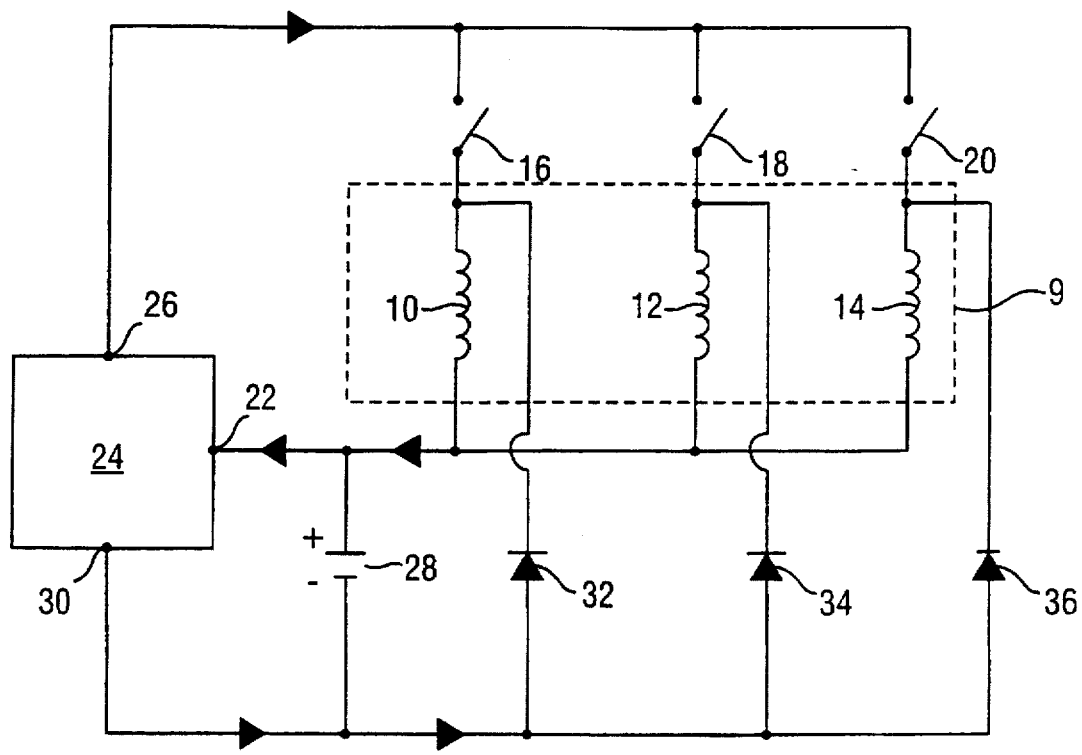
FIG. 3 is a circuit diagram of a first embodiment of the invention.

Referring particularly to FIG. 3, a switching circuit for a switched reluctance generator 9 is connected with each of three phase windings 10, 12 and 14 of the switched reluctance generator. Each of the phase windings is mounted on a stator defining stator poles that are induced with a magnetic polarity by excitation of the switched windings. A rotor is rotated within the stator by an external drive connected to a rotor shaft which constitutes the means by which the rotor is rotated.

Each phase winding 10, 12, 14 has a switch 16, 18, 20, respectively serially connected, at one end. The other ends of the phase windings of the generator 9 are commonly connected with a first terminal 22 of a boost converter 24. The switches are commonly connected to a second terminal 26 of the boost converter 24. A generator load 28, including an electrical storage device, serves as a sink for energy from the generator and as a source of excitation energy for the winding. The load 28 has a positive terminal also connected with the first terminal 22 of the boost converter 24 and, therefore, with the other ends of the commonly connected windings. A negative terminal of the load 28 is connected with a third terminal 30 of the boost converter 24. Recirculating diodes 32, 34, 36 are respectively connected to conduct from the negative terminal of the load 28 to the one end of its associated phase winding 10, 12, 14.

Figure 4:
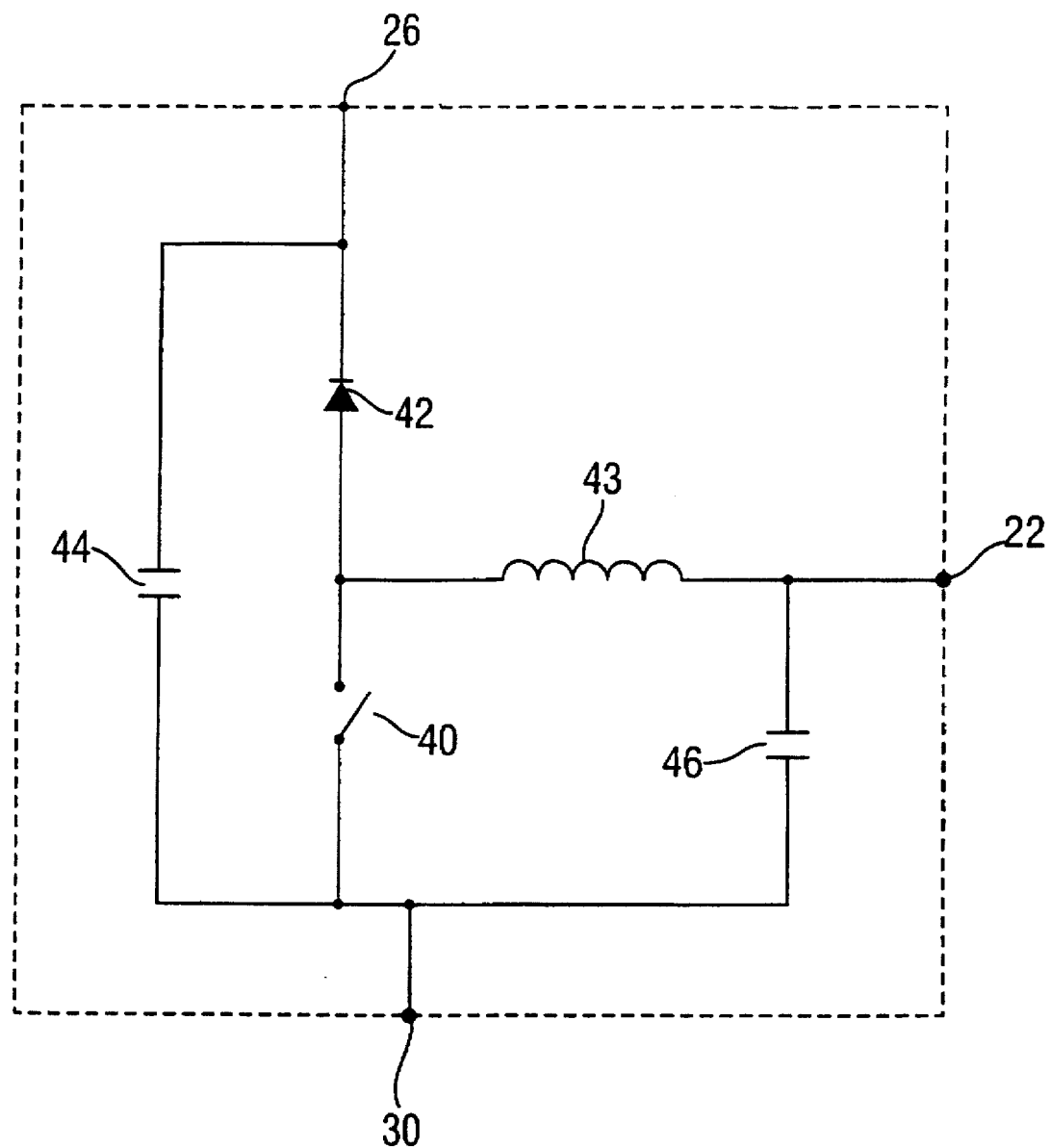
FIGS. 4 and 5 are circuit diagrams of alternative voltage boosters for use in the circuit of FIG. 3.
Figure 5:
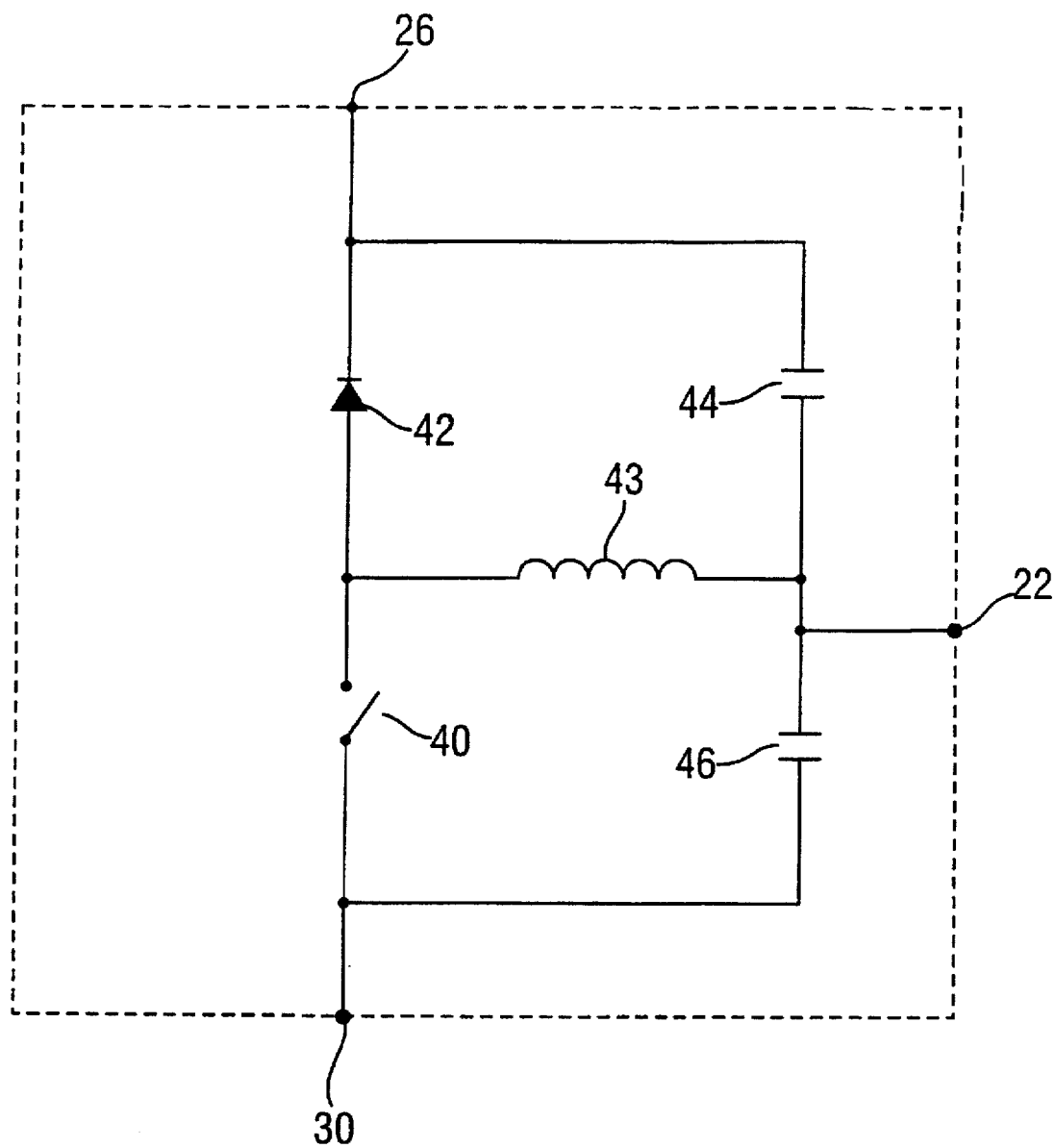

The boost converter 24 can take the form shown in FIG. 4 or FIG. 5, for example. In FIG. 4 a boost transistor 40 is connected with the third terminal 30 and with a boost diode 42 which is connected to conduct toward the second terminal 26. An inductor 43 is connected from between the serially connected boost transistor 40 and the diode 42 to the first terminal 22. A first capacitor 44 is connected across the serially connected boost transistor 40 and boost diode 42, i.e. between the second and third terminals 26 and 30. A second capacitor 46 is connected between the first and third terminals 22 and 30 of the boost converter 24.

In FIG. 5 the boost converter is similar to that in FIG. 4, but has its first capacitor connected between the first and second terminals 22 and 26. Again, this is a well known boost converter circuit and it will not be described in further detail here.

The switches 16, 18 and 20, shown schematically in FIG. 3, are typically electronic switching devices, e.g. transistors such as insulated gate bipolar transistors (IGBT's) or similar power semi-conductor devices that will be within the contemplation of the skilled person.

The boost converter 24 is used to provide a higher voltage supplied to the phase winding during a first part of the phase inductance cycle the voltage otherwise available from the load 28. The transistor 40 is switched at high frequency, typically around 10–100 kHz.

When the transistor 40 of the boost converter conducts, energy is transferred from the load 28, smoothed by the second capacitor 46, to the inductor 43. When the transistor 40 then becomes non-conducting, energy at a boosted voltage is transferred (in the case of the circuit of FIG. 4) from the inductor 43 and the load 28 to the first capacitor 44 via the diode 42 and thence to the three switches 16, 18, 20 which inject energy in turn into the generator windings 10, 12, 14. The switches 16, 18, 20 are operated at appropriate angles of rotation of the rotor in accordance with well-known switched reluctance generator timing practice.

In the case of FIG. 5, the energy in the inductor 43 is transferred to the first capacitor 44, but the energy injected into the generator windings is also derived from the first capacitor 44 and the load 28, smoothed by the second capacitor 46.

The energy, at the boosted voltage, initially injected into each of the generator windings 10, 12, 14, during conduction of the corresponding switch 16, 18, 20, is increased by SR generator action as a result of the mechanical power rotating the rotor of the SR generator. Thus, when any of the switches 16, 18, 20 is opened during its phase inductance cycle, the energy returned to the load 28, via the associated diode 32, 34, 36 exceeds the injected energy previously drawn from the load 28 at the load supply voltage. Over one or more full cycles of the SR generator, the surplus energy is available to power the load 28 as an electrical energy storage device and/or as a sink of electrical energy.

Figure 6:
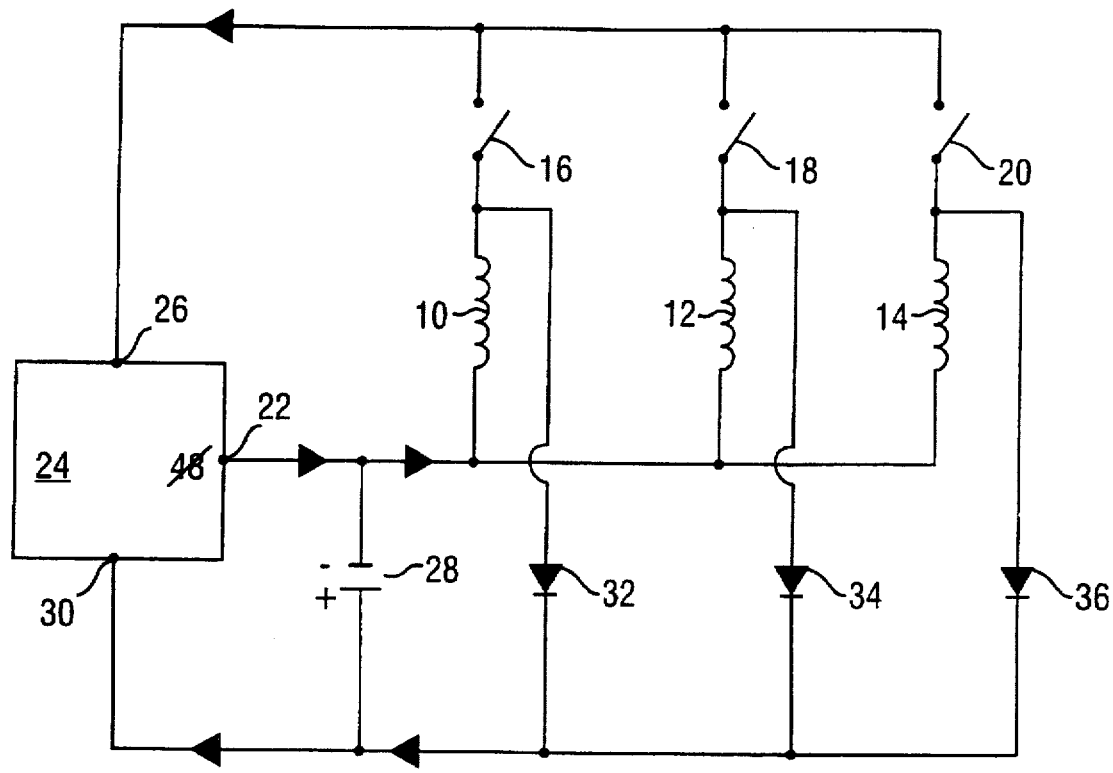
FIG. 6 is a circuit diagram of a second embodiment of the invention.
Figure 7:
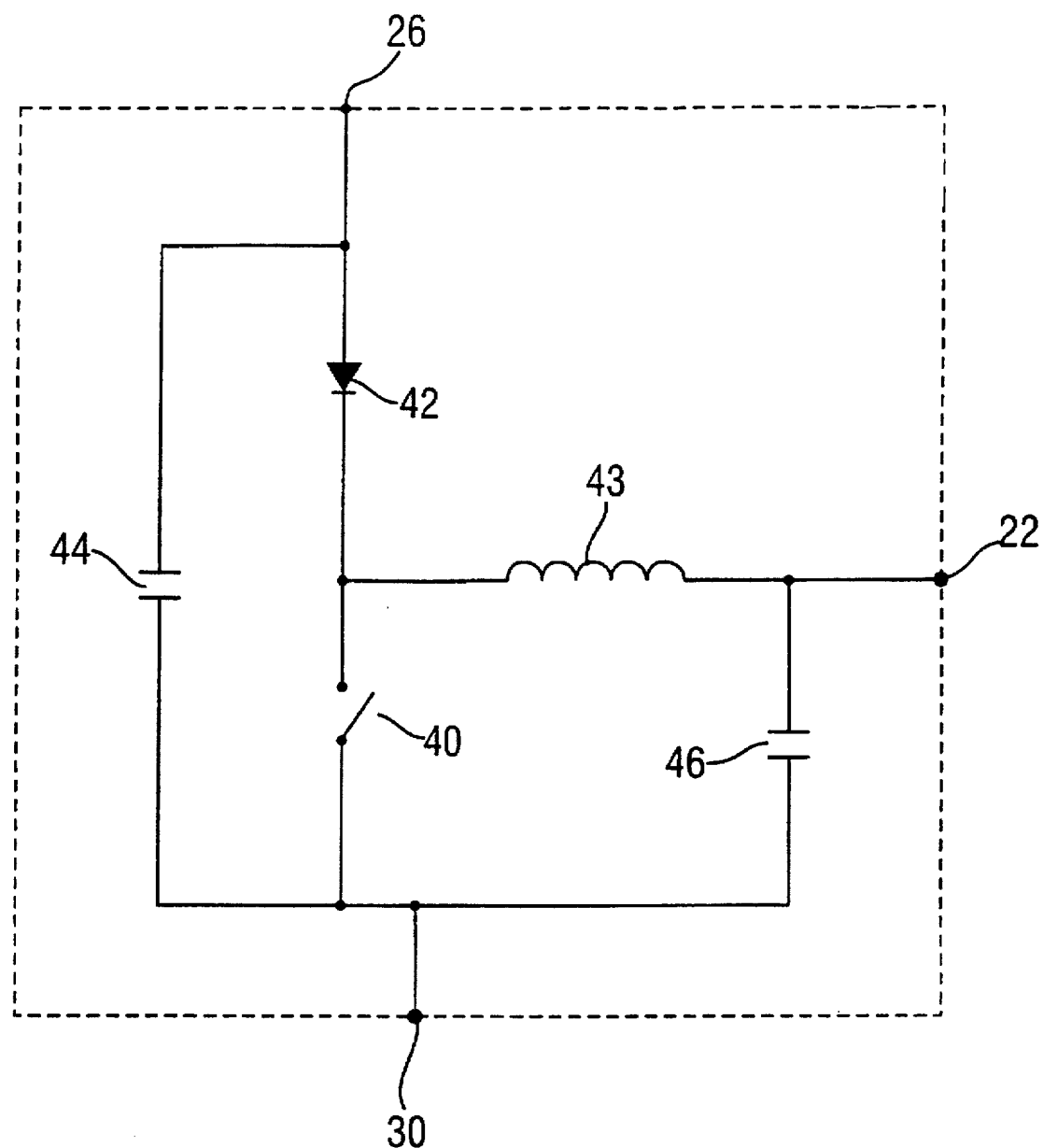
FIGS. 7 and 8 are circuit diagrams of alternative voltage boosters for use in the circuit of FIG. 6.
Figure 8:
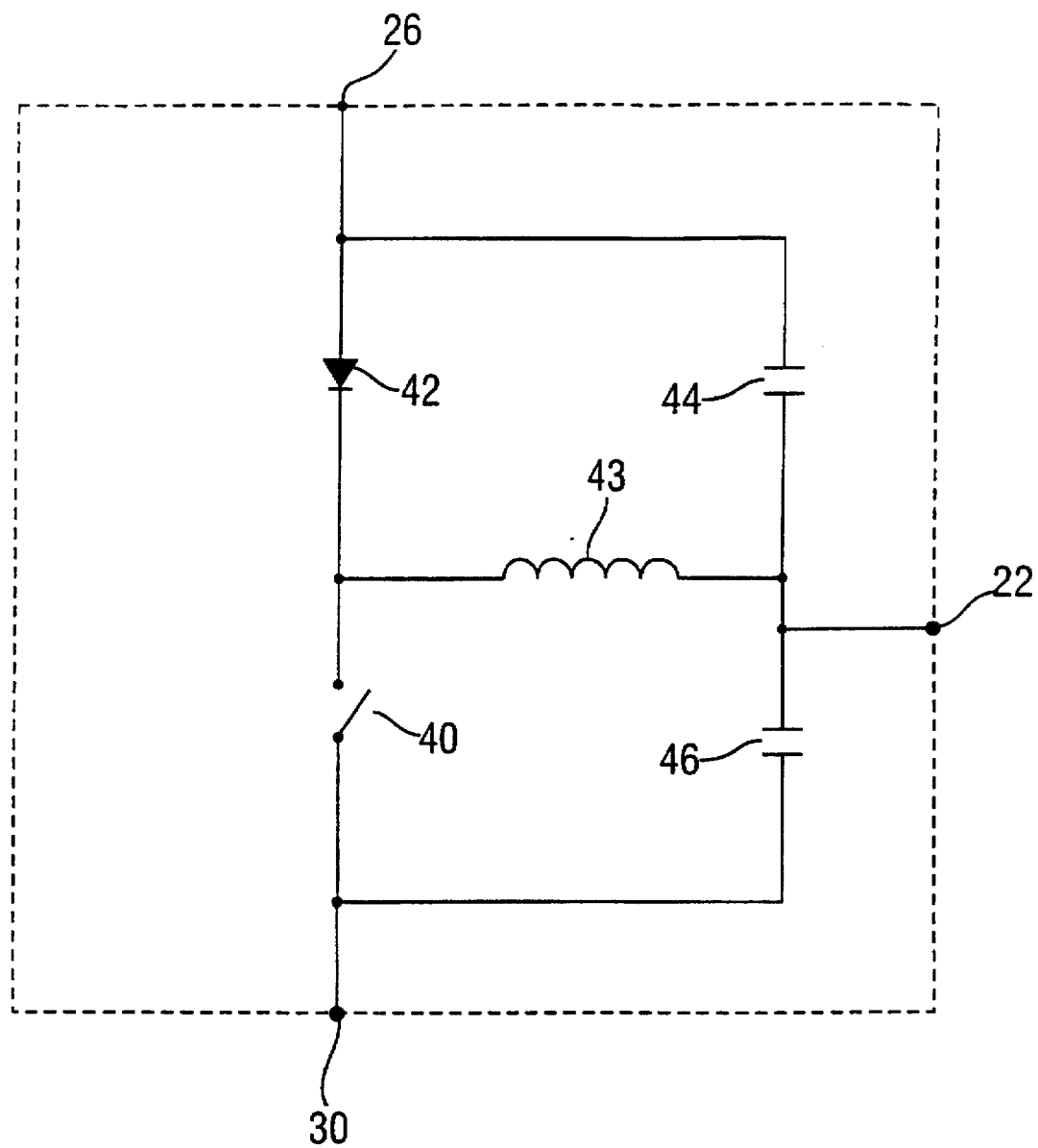

Another embodiment of the first form of the invention is shown in FIG. 6 together with alternative boost converter circuits therefor in FIG. 7 and 8. In keeping with FIGS. 3 to 5, like components have been accorded like numerals. The circuit of FIG. 6 is in effect a rearrangement of the circuit in FIG. 3.

In FIG. 6 the current flow through the windings 10, 12, 14 is in the opposite direction to that in the windings in the arrangement of FIG. 3. The polarity of the load 28 is reversed and the conducting direction of the diodes 32, 34, 36 and of the switches 16, 18, 20 are reversed i.e. all polarities and current directions are reversed. Essentially, the performance of the circuit of FIG. 6 is equivalent to that of FIG. 3 and will not be described in further detail here.

According to a second particular form of the invention, an SR generator is provided with three phase windings each of which is made up of two sections which are closely coupled magnetically and which are connected so that, when a current is passed through both sections of a phase winding, the flux produced by each section is in the same direction. The circuit of this particular form of the invention is shown in FIG. 9.

Figure 9:
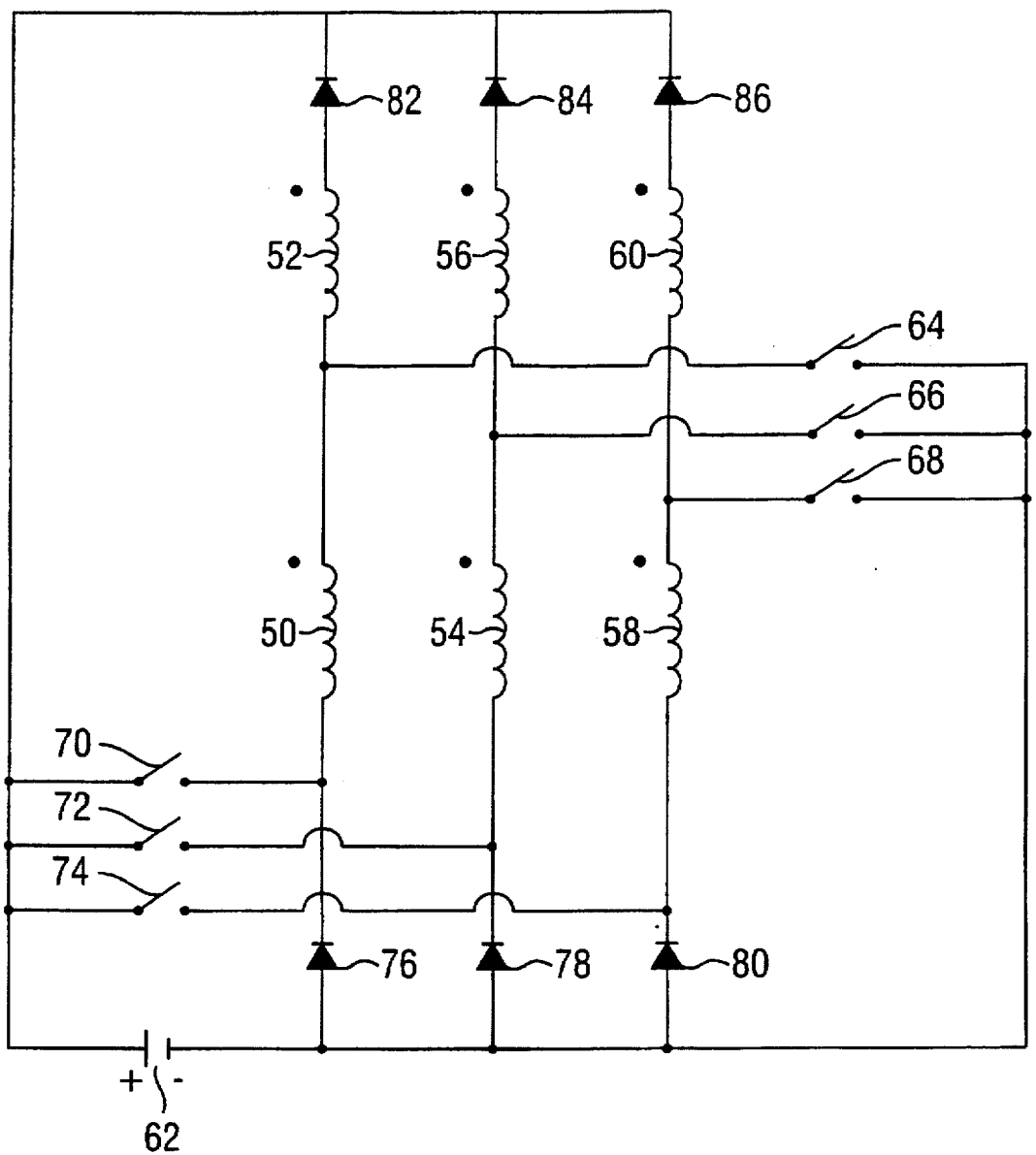
FIG. 9 is a circuit diagram of a third embodiment of the invention.

In FIG. 9, each of three phase windings is made up of first and second serially connected winding sections 50, 54 and 58; and 52, 56 and 60. A load 62 has a negative terminal connected to one end of each of first switches 64, 66, 68 which are respectively connected between each of the corresponding pair of winding sections. Similarly, each of three second switches 70, 72 and 74 is respectively connected to the opposite end of the corresponding first winding 50, 54, 58. Each of three diodes 76, 78 and 80 is respectively connected to conduct from the negative terminal of the load 62 to the opposite end of the corresponding first winding 50, 54, 58. The positive terminal of the load 62 is connected to each of three further diodes 82, 84 and 86 which are also respectively connected with the opposite ends of the corresponding second winding sections 52, 56 and 60.

As with the previous form of the invention, the switches 64 to 74 are electronic switching devices using transistors, such as IGBT's or the like.

The configuration of FIG. 9 enables energy from the load 62 to be injected in turn into one section of each phase winding over prescribed ranges of rotor angle, as discussed above, and enables the return of energy from both sections of each phase winding over a later range of rotor angular movement, the returned energy exceeding the injected energy as a result of mechanical effort rotating the rotor of the SR generator.

The circuit of FIG. 9 is so configured that the full voltage of the load 62 is applied to one section of a selected one of the phases during energy injection, but the two sections of a phase are connected in series across the load 62 when energy is being returned.

Energy from the load 62 is injected into the first winding sections 50, 54 and 58 in turn by closing the pairs of switches 70 and 64; 72 and 66; 74 and 68, creating in the corresponding winding section in turn current which flows from the load 62. When the pair of switches 70 and 64, 72 and 66, 74 and 68 associated with each phase are opened, the currents flowing in the winding sections 50, 54, 58 transfer, in part, to the second winding sections 52, 56, 60 respectively such that the flux associated with each phase is substantially unchanged. The current flowing in the two winding sections together is then increased by SR generator action, so that more energy is returned to the load via the diodes 76 and 82, 78 and 84, 80 and 86, to the load 62 than is taken from it during energy injection, as a result of mechanical effort rotating the rotor of the SR generator.

The voltage from the load 62 applied to the first winding section alone determines a relatively high rate of flux growth due to the lower inductance. When the load 62 is applied across the phase winding as a whole the same voltage determines a lower rate of flux decay because of the increased inductance.

In a particularly useful form the two sections of each phase winding have equal numbers of turns and are wound in a bifilar manner to maximise the magnetic coupling between the two sections of a phase. The resulting close coupling assists the transfer of current between the two sections.

In keeping with the typical prior art switching circuits, there are two active switches in this embodiment for each phase winding. After energy has been injected into one of the winding pairs, say 50/52, as described above it is then possible to transfer energy between the rotor and the winding in a freewheeling mode by turning off one of the associated switches without passing current to, or taking a current from, the load 62 and to turn off the second switch after a delay amounting to a fraction of the phase inductance period. This actuation of switches in the freewheeling mode after energy injection, but before the return of energy to the load, provides an extra degree of freedom for the control of SR generators, particularly at low speed.

Figure 10:
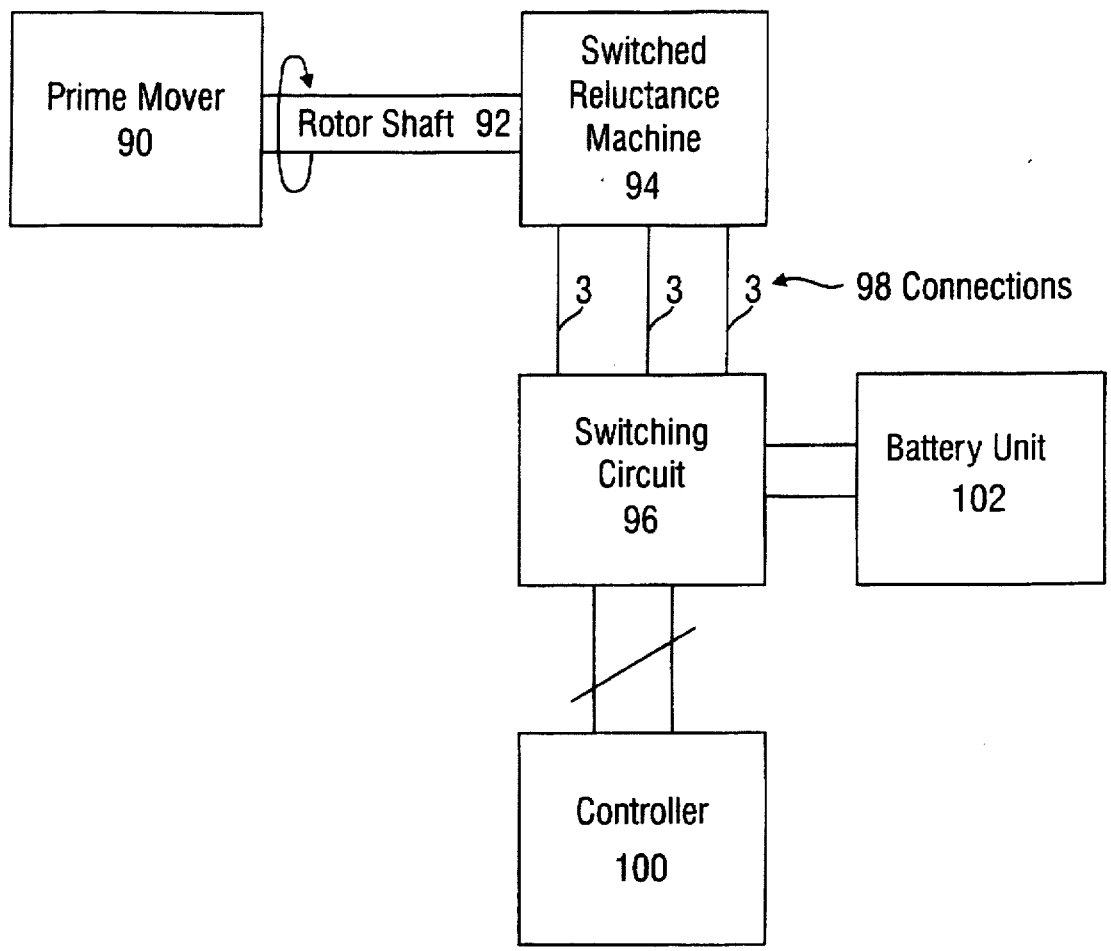
FIG. 10 is a schematic diagram of a generator system in which the invention may be incorporated.
Figure 11:
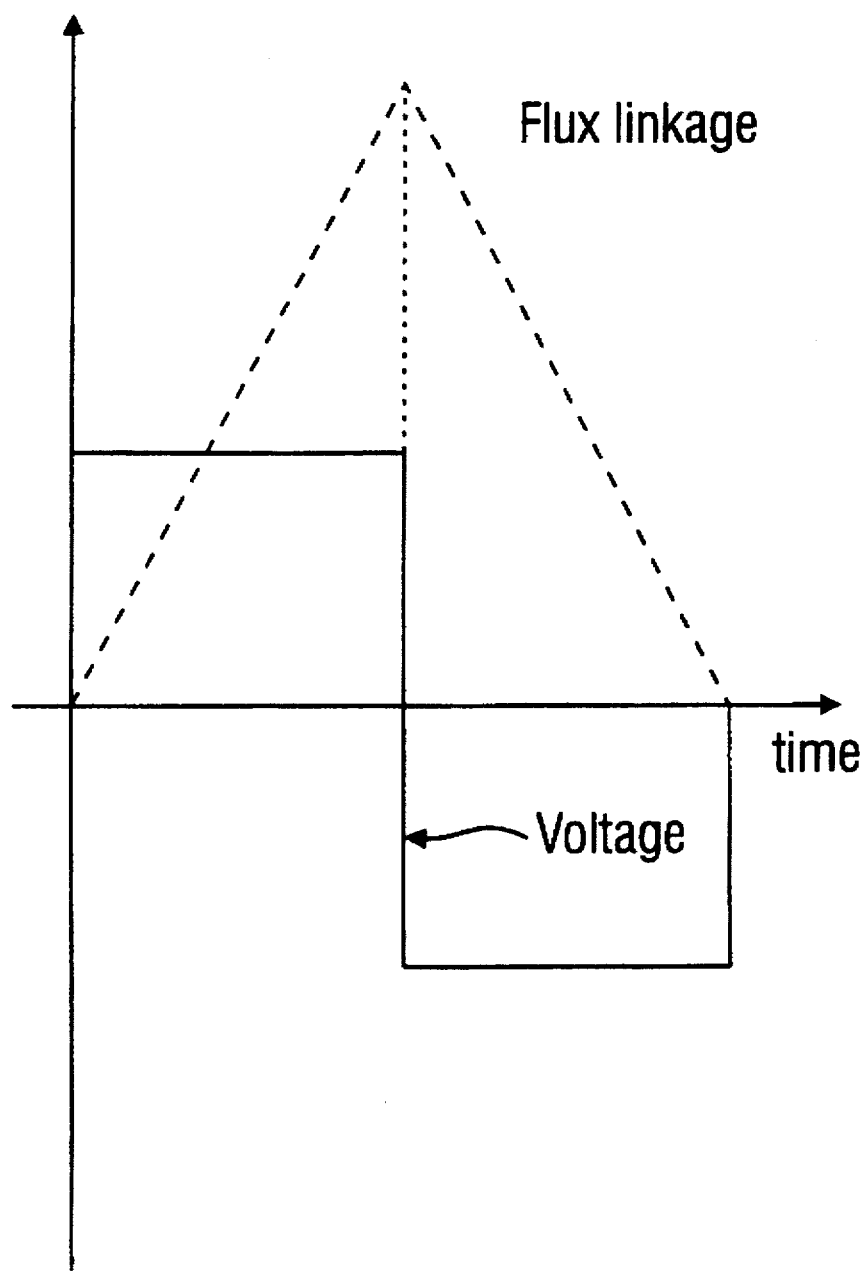
FIG. 11 illustrates the growth and decay of an exemplary flux wave form.

For the sake of clarity FIG. 10 shows a switched reluctance generator system in which the invention is usable. The system consists of a prime mover 90 (for example an internal combustion engine) which is operably connected with the shaft of a rotor 92 which is part of the switched reluctance machine 94. In this embodiment a three phase machine is illustrated. This is controlled by a switching circuit 96 which controls the energy in the three phase windings through connections 98 under the control of a controller 100. The energy supply and return controlled by the switching circuit is to and from a common battery unit 102 acting as the load.

At low speed the energy injection can be performed using the circuit of FIG. 9 as described above. The energy returned to the load (i.e. generated) can involve alternate periods of freewheeling and energy return in a phase inductance cycle. During the freewheeling period the winding current increases, drawing energy from the rotor. During energy return energy, with the additional contribution from the rotor, is returned to the load. The use of the alternate periods of freewheeling and energy return may be referred to as 'chopping'. At low speeds the chopping mode can be used to increase the duration in which current can be drawn from the generating system, thus enabling the extended duration to be a greater fraction of the phase inductance cycle.

In general the invention increases the proportion of a phase inductance period available for generating and reduces the proportion in which motoring takes place. Thus, while the invention has been described in connection with the illustrative embodiments discussed above, those skilled in the art will recognise that many variations may be made without departing from the present invention. Accordingly, the above description of several embodiments is made by way of example and not for purposes of limitation. The present invention is intended to be limited only by the spirit and scope of the following claims.

What is claimed is:

1. A switched reluctance generator system comprising a rotor; a stator having at least one phase winding, switch means, means for supplying energy to the phase winding according to actuation of the switch means, means for rotating the rotor relative to the stator and control means operable to control the switch means, the control means being arranged to actuate the switch means for supplying energy at a first voltage across at least part of the phase winding to cause flux growth at a first rate during a first part of a phase inductance cycle, and being arranged to actuate the switch means to switch a second voltage across the phase winding to cause flux decay at a second rate, which second rate of decay is slower than the first rate of flux growth, rotation of the rotor causing energy to be supplied at the second voltage from the phase winding during the second part of the phase inductance cycle.

2. A system as claimed in claim 1 in which the first voltage is larger than the second voltage.

3. A system as claimed in claim 1, including voltage boosting means arranged to receive the energy generated at the second voltage and to boost it to another voltage.

4. A system as claimed in claim 3 in which the voltage boosting means are arranged to boost the energy generated at the second voltage to the first voltage.

5. A system as claimed in claim 1 in which the phase winding is tapped such that the first voltage is applied to a first part of the phase winding and the second voltage is applied across the first and second parts of the phase winding.

6. A system as claimed in claim 5 in which the first and second voltages are substantially the same.

7. A system as claimed in claim 5 or 6 in which the first and second parts of the phase winding are arranged to be closely magnetically coupled.

8. A system as claimed in claim 7 in which the first and second parts of the phase winding are connected in series.

9. A system as claimed in claim 7 in which the first and second parts of the phase winding are bifilar wound.

10. A system as claimed in any of claim 1 in which the means for supplying energy comprise an electrical storage device.

11. A system as claimed in claim 10 in which the electrical storage device is also arranged to absorb the energy generated at the second voltage.

12. A method of operating a switched reluctance generator comprising a rotor and a stator having at least one stator winding, the method comprising:
   rotating the rotor;
   switching a first voltage across at least part of the phase winding during a first part of a phase inductance cycle to cause flux growth at a first rate during the first part of the phase inductance cycle;
   switching a second voltage across the phase winding during a second part of the phase inductance cycle to cause flux decay at a second rate, which second rate of decay is slower than the first rate of flux growth, during the second part of the phase inductance cycle.

13. A method as claimed in claim 12 in which the first voltage is larger than the second voltage.

14. A method as claimed in claim 13, including boosting the second voltage to the first voltage.

15. A method as claimed in claim 12, including applying the first voltage to one of two parts of the phase winding during the first part of the phase inductance cycle and applying the second voltage to both parts of the phase winding during the second part of the phase inductance cycle.

16. A method as claimed in claim 15 in which the first and second voltages are substantially the same.

17. A switched reluctance generator comprising:
   a rotor; a stator having at least one phase winding, the rotor being rotatable relative to a stator; switch means; and control means operable to control the switch means, the control means being arranged to actuate the switch means to switch a first voltage across at least part of the phase winding to cause flux growth at a first rate during a first part of a phase inductance cycle of the rotor, and being arranged to actuate the switch means to switch a second voltage across the phase winding to cause flux decay at a second rate, which second rate of decay is slower than the first rate of flux growth, rotation of the rotor causing energy to be generated at the second voltage from the phase winding during the second part of the phase inductance cycle.

18. A generator as claimed in claim 17, including voltage boosting means arranged to receive energy generated at the second voltage and to boost it to another voltage.

19. A generator as claimed in claim 17 in which the phase winding is arranged into first and second parts such that the first voltage is applicable to the first part of the phase winding and the second voltage is applicable across the first and second parts of the phase winding.

20. A generator as claimed in claim 19 in which the first and second parts of the phase winding are arranged in a closely magnetically coupled relationship.

21. A generator as claimed in claim 19 or 20 in which the first and second parts are connected in series.

22. A generator as claimed in claim 20 in which the first and second parts are bifilar wound.

23. A generator as claimed in any of claim 19 in which the first and second voltages are substantially equal.

24. A generator as claimed in claims 17 in which the switch means comprise an active switch and a diode, the active switch being arranged to permit flux growth when conducting, the diode being arranged such that generated energy is constrained to flow therethrough when the active switch is non-conducting.

* * * * *

UNITED STATES PATENT AND TRADEMARK OFFICE
CERTIFICATE OF CORRECTION

PATENT NO. : 5,705,918
DATED : January 6, 1998
INVENTOR(S) : Rex M. Davis

It is certified that error appears in the above-identified patent and that said Letters Patent is hereby corrected as shown below:

In claim 17, column 8, line 50, before "stator" and following "to", please delete "a" and insert therefor --the--.

In claim 23, column 10, line 1, please delete "any of".

In claim 24, column 10, line 3, please delete "claims" and insert therefor --claim--.

On the title page, in the section labeled "References Cited", please delete "5,548,964" and insert therefor --5,545,964--.

Signed and Sealed this

Twenty-first Day of April, 1998

Attest:

BRUCE LEHMAN

Attesting Officer

Commissioner of Patents and Trademarks